C. SPINDLER.
METHOD OF AND APPARATUS FOR DETERMINING THE PURITY OF CARBONIC ACID GAS.
APPLICATION FILED NOV. 21, 1918.
1,303,514.   Patented May 13, 1919.
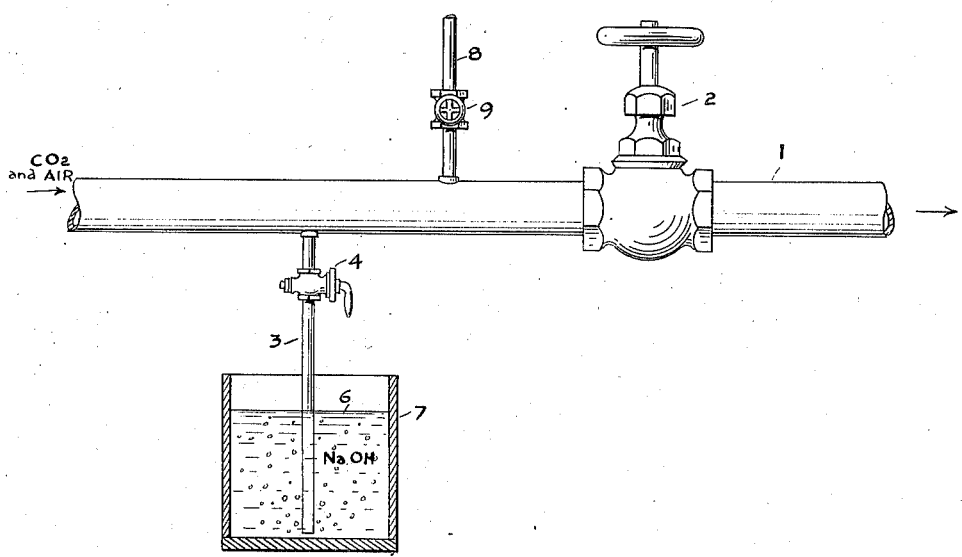
INVENTOR
CHAS. SPINDLER

UNITED STATES PATENT OFFICE.

CHARLES SPINDLER, OF SAN FRANCISCO, CALIFORNIA.

METHOD OF AND APPARATUS FOR DETERMINING THE PURITY OF CARBONIC-ACID GAS.

1,303,514. Specification of Letters Patent. Patented May 13, 1919.

Application filed November 21, 1918. Serial No. 263,467.

*To all whom it may concern:*

Be it known that I, CHARLES SPINDLER, a citizen of the United States, residing at San Francisco, in the county of San Francisco and State of California, have invented new and useful Improvements in Methods of and Apparatus for Determining the Purity of Carbonic-Acid Gas, of which the following is a specification.

To determine the degree of purity (by which is meant freedom from air to the extent of 99% or better) of carbonic acid gas for commercial use as in carbonating so-called soft drinks, or cider, beer and wine, caustic soda is employed.

In the present method of determining the degree of purity a sample of the gas is inclosed in a vessel comprising, as part of it, a glass tube graduated above 99% in tenths of 1%. A solution of caustic soda is then fed into the gas-containing vessel. The caustic soda absorbs all the carbonic acid gas, and the remaining air space indicates the percentage of air and other impurities.

This process is slow, the apparatus employed is delicate and comparatively expensive, and it requires a more or less skilled man to manipulate it.

The object of the present invention is to provide a method of determining the comparative purity of carbonic acid gas which will be simple, easy and quick, and an apparatus for carrying out said method which will be inexpensive.

In the accompanying drawing the figure is a side view of my improved apparatus, a vessel forming a part thereof being shown in section.

Referring to the drawing, 1 indicates a pipe leading from a generator of carbonic acid gas to a place of storage or consumption of the same. In said pipe is a valve 2 for controlling the passage of the gas therein. Leading downward from said pipe is a test pipe 3 having a valve 4 therein and discharging at its lower end below the surface of a caustic soda solution 6 in an open topped vessel 7. Leading upwardly from the pipe 1 is a vent pipe 8 having a controlling valve 9 therein.

I do not regard said pipe 8 and valve 9 as an essential part of my invention, although its use is preferable. Supposing it to be used the operation is as follows:

When the generation of carbonic acid gas is started, the valves 2 and 4 are closed and the valve 9 is opened. At that time the carbonic acid gas is mixed with a considerable proportion of air and other impurities. This mixture is allowed to escape by the pipe 8. When the stage of the operation approaches at which the carbonic acid gas is sufficiently pure, the valve 9 is closed and the valve 4 opened. Thereafter the mixture descends by the pipe 3 and is discharged into the caustic soda and the small percentage of air still contained in the mixture is not dissolved thereby but flows upward therethrough in the form of bubbles and escapes through the open top of the vessel. When the bubbles can no longer be seen it is known that no air is mixed with the gas and that the carbonic acid gas is at least 99% pure. Then the valve 4 is closed and the valve 2 is opened to permit the carbonic acid gas to flow where it is desired to be used.

The great economy and simplicity of the apparatus and process are at once apparent.

I claim:

1. The method of determining the stage in the production of carbonic acid gas at which it becomes substantially free from admixture with air which consists in causing the mixture to flow through a solution of caustic soda and observing the presence or absence of bubbles in the caustic soda.

2. An apparatus for determining the stage in the process of generation of carbonic acid gas at which the carbonic acid gas becomes substantially free from admixture with air comprising a delivery pipe for delivering the carbonic acid gas to the place of consumption, a valve therein, a test pipe leading from the delivery pipe, a vessel, and a solution of carbon dioxid absorbent in said vessel, the testing pipe discharging below the surface of said solution.

3. An apparatus for determining the stage in the process of generation of carbonic acid gas at which the carbonic acid gas becomes substantially free from admixture with air comprising a delivery pipe for delivering the carbonic acid gas to the place of consumption, a valve therein, a test pipe leading from the delivery pipe behind said valve, a valve in said testing pipe, a vessel, a solution of carbon dioxid absorbent in said vessel, the testing pipe discharging below the surface of said solution, a vent pipe also leading from the delivery pipe behind said valve and a controlling valve therein.

CHARLES SPINDLER.